(12) United States Patent
Heino et al.

(10) Patent No.: US 7,761,808 B2
(45) Date of Patent: Jul. 20, 2010

(54) SOFT KEYS OF THE ACTIVE IDLE PLUG-INS OF A MOBILE TERMINAL

(75) Inventors: Päivi Heino, Viiala (FI); Kim Eklund, Espoo (FI)

(73) Assignee: Nokia Corporation, Espoo (FI)

( * ) Notice: Subject to any disclaimer, the term of this patent is extended or adjusted under 35 U.S.C. 154(b) by 311 days.

(21) Appl. No.: 11/172,011

(22) Filed: Jun. 29, 2005

(65) Prior Publication Data
US 2007/0006087 A1 Jan. 4, 2007

(51) Int. Cl.
G06F 3/048 (2006.01)
G06F 3/14 (2006.01)
H04B 1/38 (2006.01)
G06F 3/02 (2006.01)

(52) U.S. Cl. ............... 715/810; 715/864; 455/566; 345/172

(58) Field of Classification Search ............ 715/810, 715/814, 841, 864; 455/566; 345/172
See application file for complete search history.

(56) References Cited

U.S. PATENT DOCUMENTS

| | | | | |
|---|---|---|---|---|
| 5,805,167 A | * | 9/1998 | van Cruyningen | 715/808 |
| 5,936,611 A | * | 8/1999 | Yoshida | 345/158 |
| 6,618,063 B1 | * | 9/2003 | Kurtenbach | 715/834 |
| 2003/0025676 A1 | * | 2/2003 | Cappendijk | 345/173 |
| 2003/0050040 A1 | * | 3/2003 | Yamazaki et al. | 455/404 |
| 2003/0101417 A1 | * | 5/2003 | Hobrack | 715/517 |
| 2004/0183836 A1 | * | 9/2004 | Pagan | 345/810 |
| 2005/0009571 A1 | * | 1/2005 | Chiam et al. | 455/566 |
| 2005/0246660 A1 | * | 11/2005 | Fehrm | 715/810 |
| 2006/0218502 A1 | * | 9/2006 | Matthews et al. | 715/779 |

OTHER PUBLICATIONS

Microsoft Windows (hereinafter "Windows"), copyright 2001 (Screenshots 1-3).*

* cited by examiner

*Primary Examiner*—Ting Lee
(74) *Attorney, Agent, or Firm*—Harrington & Smith

(57) ABSTRACT

The invention relates to a method for utilizing specialized primary and secondary menus for different applications included in a mobile terminal. The invention also relates to a menu display controller and mobile terminal using the method. In the method a cursor movement between items of the primary menu causes a new secondary menu to appear on the display. The user can also move inside the secondary menu and execute directly from the secondary menu a function included in the secondary menu.

16 Claims, 6 Drawing Sheets

SOFT KEYS OF THE ACTIVE IDLE PLUG-INS OF A MOBILE TERMINAL

TECHNICAL FIELD OF THE INVENTION

The invention relates to a method for utilizing specialized soft key menus with different applications included in a mobile terminal. The invention also relates to a menu display controller and mobile terminal using the method. The invention relates also to a computer program product implementing the menu display controller in the mobile terminal.

BACKGROUND OF THE INVENTION

A modern mobile cellular terminal comprises many advanced software applications and distinct accessories. Some examples of these accessories are for example a digital camera, camcorder and MP3 player. The applications and accessories, which are often called plug-ins, included in the mobile terminal can have a user definable shortcut as a default setting.

All these plug-ins must be operable in the one and same cellular terminal. In the prior art a certain kind of default soft key arrangement is utilized with all these plug-ins. The user can open with one soft key a menu including selectable items. The user moves inside the menu by a browser key. The user selects one item from the menu by another soft key often named "Select". After the made selection a new menu opens including new selectable items. Then the user once again selects one item from the menu by pressing "Select" soft key.

However, the functionality can differ a lot from one plug-in to another plug-in. This also affects to the usability of a certain plug-in when only a prior art soft default menu arrangement is at hand, which must be suitable for several plug-ins.

FIG. 1a shows one exemplary terminal device 10 according to the prior art. It is shown in so called Normal Idle mode. The terminal device 10 in FIG. 1a comprises a display unit 11, a numerical/alphabetical keyboard 12, a four-way key 121 (or advantageously a five-way key) and two programmable keys 131 and 132, i.e. soft keys. The soft keys 131 and 132 have been arranged to perform an operation, which is shown on the display 11 beside the soft key. In the example of FIG. 1a the soft key 132 executes a selection function, reference 112, and the soft key 131 cancels a previous action, reference 111. As an example on the display 11 is also shown an envelope 120 indicating that a message has been arrived and it is unread.

FIG. 1b shows the terminal device 10 of FIG. 1a when making browsing according to the prior art. In this example on the right side of the display 11 can be seen a primary list 113 of selectable items. One item, Calendar, is now selected and this is highlighted by an oblong 114. A user can move inside the primary list 113 from one item to another item by utilizing the four-way key 121. The user selects one item by pressing "Select" soft key 132.

In the example of the FIG. 1a the keys 12, 121, 131 and 132 have been implemented as separate physical keys by way of example. It is obvious to a person skilled in the art that they can also be implemented with the principle of a touchscreen display, in which case the limit between the actual display part 11 and the part that contains keys 12, 121, 131 and 132 is a question of definition.

The terminal 10 can also be in so called Active Idle mode. This means that applications, which are implemented in the terminal 10, can give a distinct visual signal when the application needs the attention of the user. If the user does not react any way the signal slowly disappears or limits its size after a while. For example the envelope can fill the whole display 11 first for some seconds. If the user does not react in any way, it shrinks after a while to a small envelope 120.

SUMMARY OF THE INVENTION

The object of the present invention is to provide a method, menu display controller, mobile terminal and computer program product for aiding a user of a mobile terminal to select and execute a function connected to an application or accessory from a menu shown on a display of the mobile terminal faster and easier than it is possible in the prior art.

The objects of the present invention are fulfilled by providing a fast method for executing a function from a menu on a display of a mobile terminal and computer program product for implementing the method, the method comprising the steps of:
  providing a primary menu and a secondary menu on the display;
  moving between items of the primary menu;
  changing the secondary menu to show items connected to the item selected in the primary menu;
  moving inside the secondary menu; and
  executing a function connected to the item selected in the secondary menu.

Also the objects of the present invention are fulfilled by providing a menu display controller and mobile terminal utilizing the display controller comprising:
  a means for showing a primary menu and secondary menu on a display of the mobile terminal;
  a means for moving between items of the primary menu;
  a means for changing the secondary menu to show items connected to the item selected in the primary menu;
  a means for moving inside the secondary menu; and
  a means for executing a function connected to the item selected in the secondary menu.

According to the present invention a mobile terminal includes a means which allows utilizing two separate menus at the same time on a display of the mobile terminal. The two menus according to the invention are shown on a display of the mobile terminal when browsing between possible applications and accessories, which are included in the mobile terminal. The main menu according to the invention can be called as a primary menu. The user of the mobile terminal can move inside the primary menu by utilizing a first browser key. When the user moves inside the primary menu from one item to another that changes items of the secondary menu also shown on the display of the mobile terminal. The secondary menu includes the most frequently utilized functional alternatives of the item, which is currently selected from the primary menu. The user of the mobile terminal can also move inside the secondary menu advantageously by utilizing a second browser key. When a cursor of the secondary menu is on an item which the user wants to execute, the user advantageously presses an execute key.

In one advantageous embodiment of the invention the secondary menu disappears after a while if the user does not react to the changed secondary menu.

In another advantageous embodiment of the invention the secondary menu returns to a default which discloses only one item "Select" if the user does not react to the changed secondary menu.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION

Figure 1A:
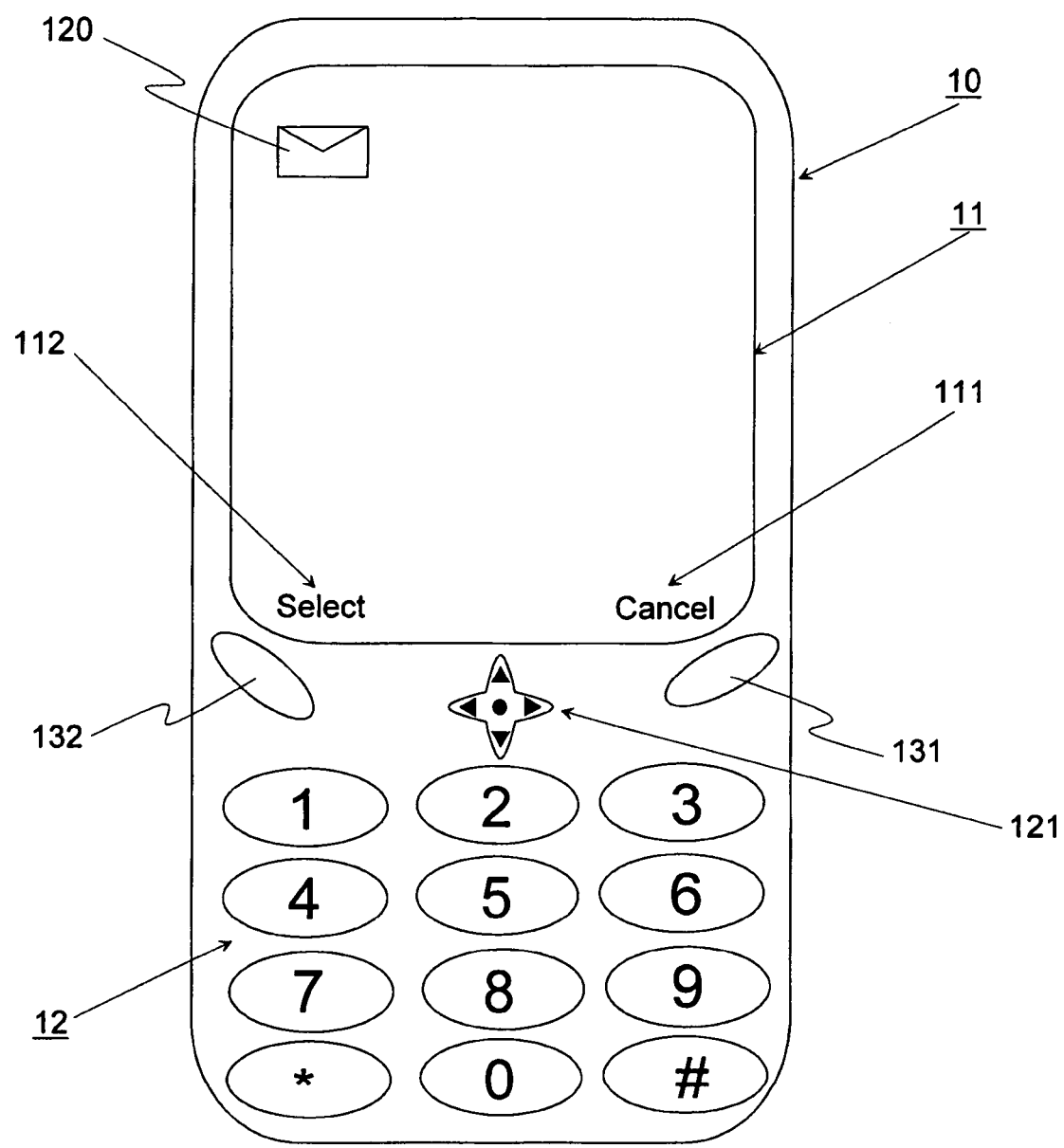
FIG. 1a shows a schematical representation of a mobile terminal of a prior art in Normal Idle mode.
Figure 1B:
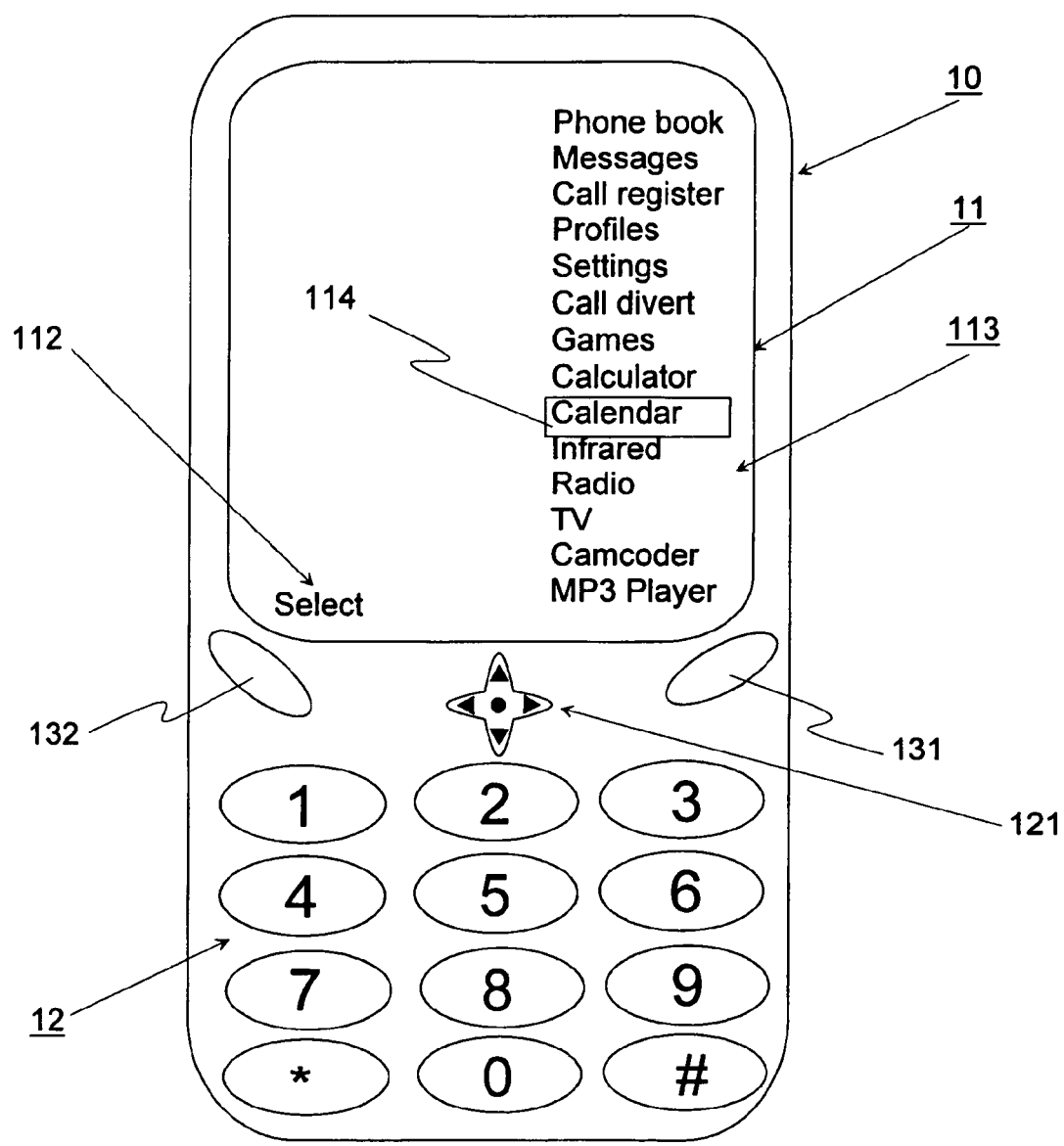
FIG. 1b shows a schematical representation of a mobile terminal of a prior art in Normal Idle mode during a menu browsing operation.

FIGS. 1a and 1b were discussed in conjunction with the description of the prior art.

Figure 2A:
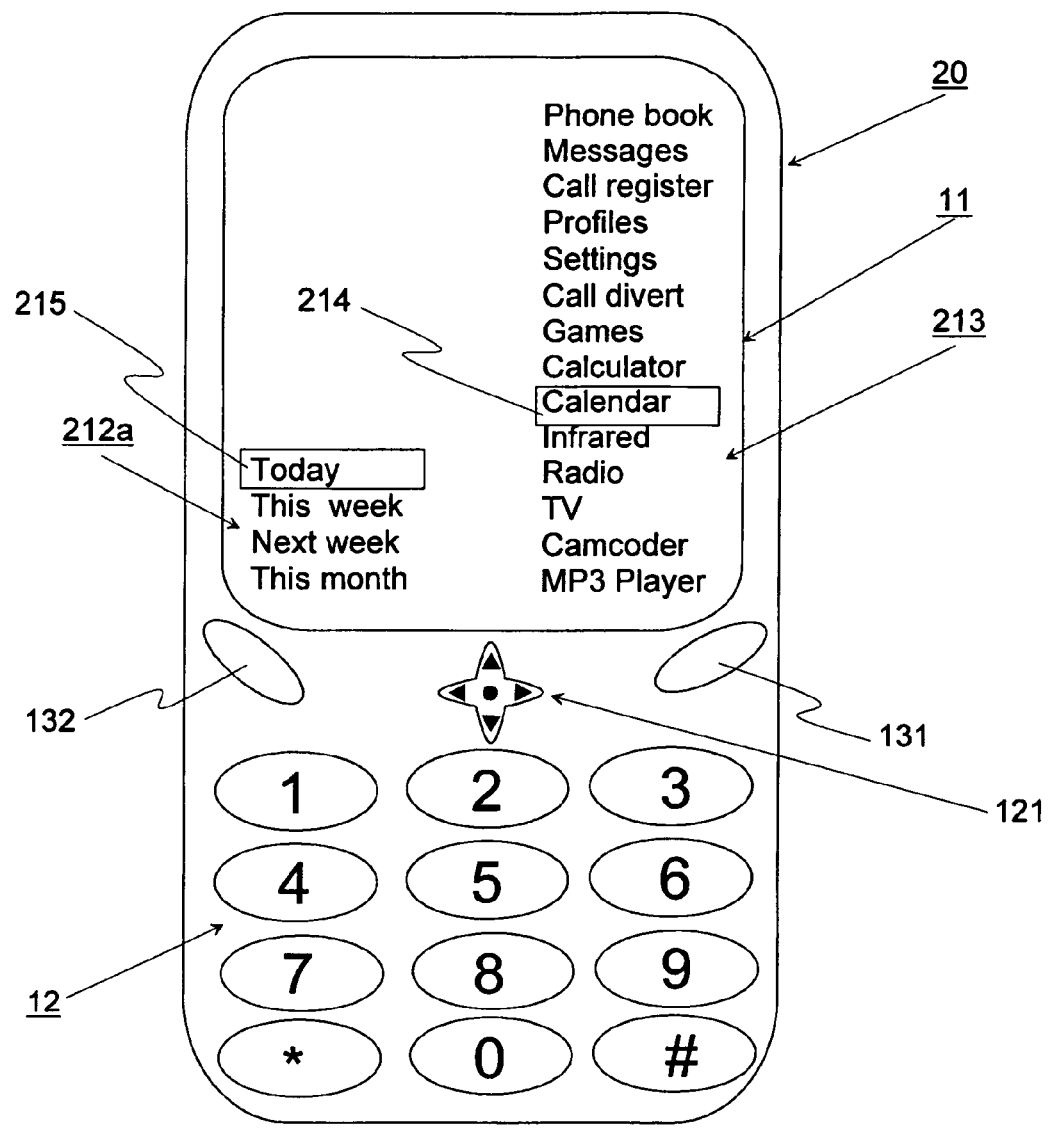
FIG. 2a shows an example of a display of a mobile terminal utilizing the present invention during the browsing.
Figure 2B:
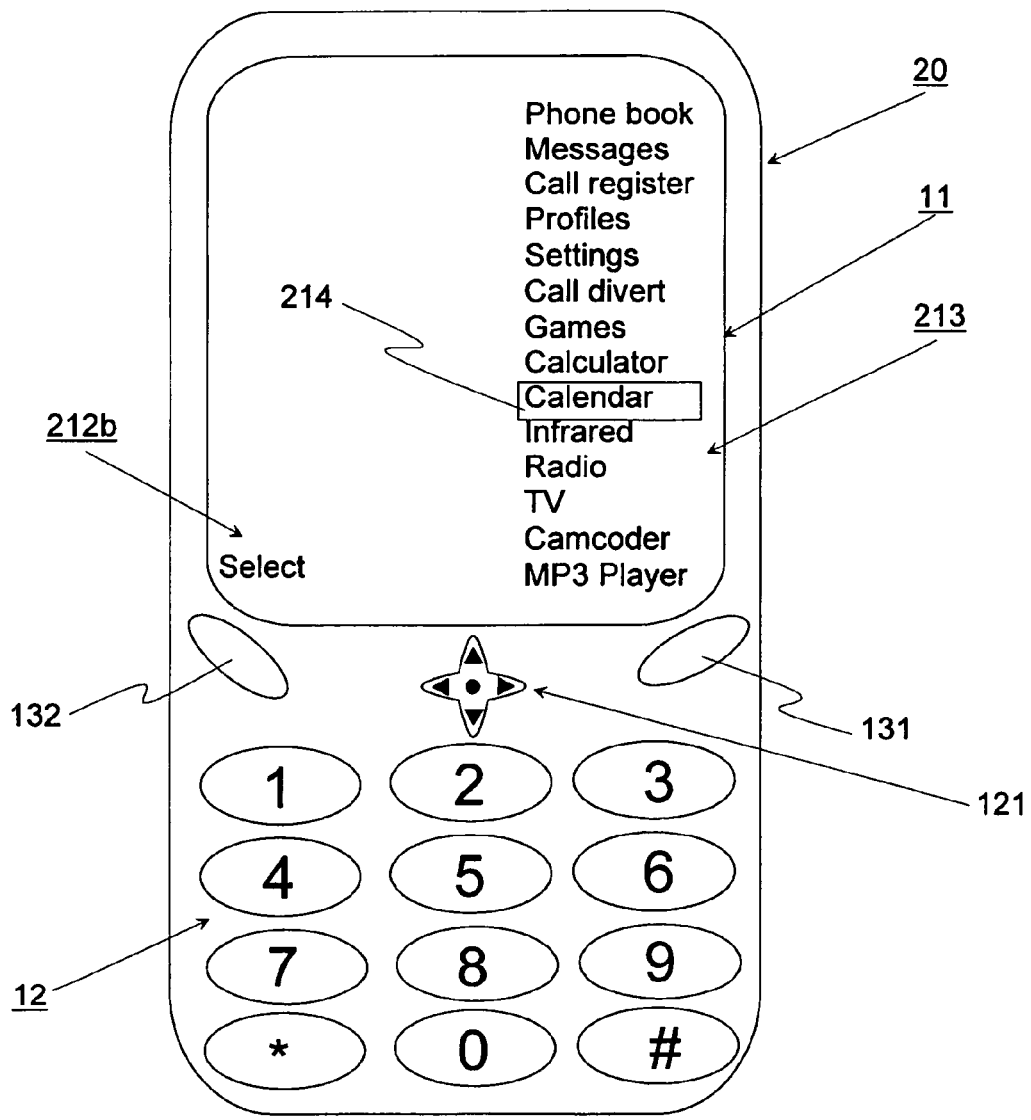
FIG. 2b shows an example where on a display of a mobile terminal utilizing the present invention the secondary menu has returned to a default.

FIGS. 2a and 2b illustrate an example how the present invention can be applied in a mobile terminal 20. The main functional elements of the mobile terminal 20 were already discussed with FIGS. 1a and 1b.

In FIG. 2a the display 11 of the mobile terminal 20 according to the invention comprises two separate menus. They are a primary menu 213 and a secondary menu 212a. The primary menu 213 comprises advantageously all user applications which are implemented in the mobile terminal 20. If the list is too long to fit in the display 11 in one go, it can advantageously be scrolled up or down when the cursor is in the upper most or lower most item of the primary menu 213. The secondary menu 212a comprises advantageously at least partly different items for every item included in the primary menu 213.

The user can move inside the primary menu 213 by a browser key. In the example of FIG. 2a the user can advantageously utilize up and down choices of a four-way key 121 when moving inside the primary menu 213. With the four-way key 121 the user has in the example of FIG. 2a moved a cursor oblong 214 on "Calendar" application.

The cursor movement above "Calendar" has caused a secondary menu 212a to be opened on the display 11. In this context the secondary menu 212a comprises four possible time alternatives which can be opened because the content of the secondary menu 212a is tied with the item "Calendar" in the primary menu 213.

The user can move a secondary cursor in the secondary menu 212a by the secondary browser key. Advantageously left and right choices of the four-way key 121 can be utilized to move the secondary cursor 215. In the example of FIG. 2a the user has moved a secondary cursor, oblong 215, above an item "Today".

If the user now presses an execution key, a calendar of today opens on the display 11. If the mobile terminal 20 comprises a five-way, the opening of the alternative "Today" can advantageously be done by pressing the middle of the five-way key.

It is obvious to a man skilled in the art that any other keys included in the mobile terminal 20 can be utilized to move the primary cursor 214, secondary cursor 215 or execution key instead of the depicted four-way key (five-way key). Also it is obvious to use other cursor types than the depicted oblong of FIGS. 2a and 2b FIG. 2b depicts a situation where the user of the mobile terminal 20 has not been reacted to the opened secondary menu 212a. In the method according to the invention the secondary menu 212a of FIG. 2a shrink to a soft key "Select", reference 212b, after a predetermined time. The time after which this happens is advantageously user definable.

If the user after a while presses key 132, the secondary menu 212a advantageously opens again. There are two advantageous embodiments which differ from each other in a content of the secondary menu. In the first advantageous embodiment the content is the same, which was earlier opened up because of the movement of the primary cursor 214.

In a second advantageous embodiment the secondary menu comprises more choices than the secondary menu 212a which was automatically opened. This feature allows to the user a flexible way to work with an expanded secondary menu. If the most frequently items are enough the user can activate the function right away from the automatically opened secondary menu 212a. If it lacks an item needed by the user, the user only waits some seconds and by selecting the secondary menu again the user comes on line the whole repertoire of choices.

The idea of the present invention is to offer to the user for a while those options immediately, which in the prior art are achieved by using "Select" soft key. This makes the selection faster and easier for the user of the mobile terminal.

Figure 3:
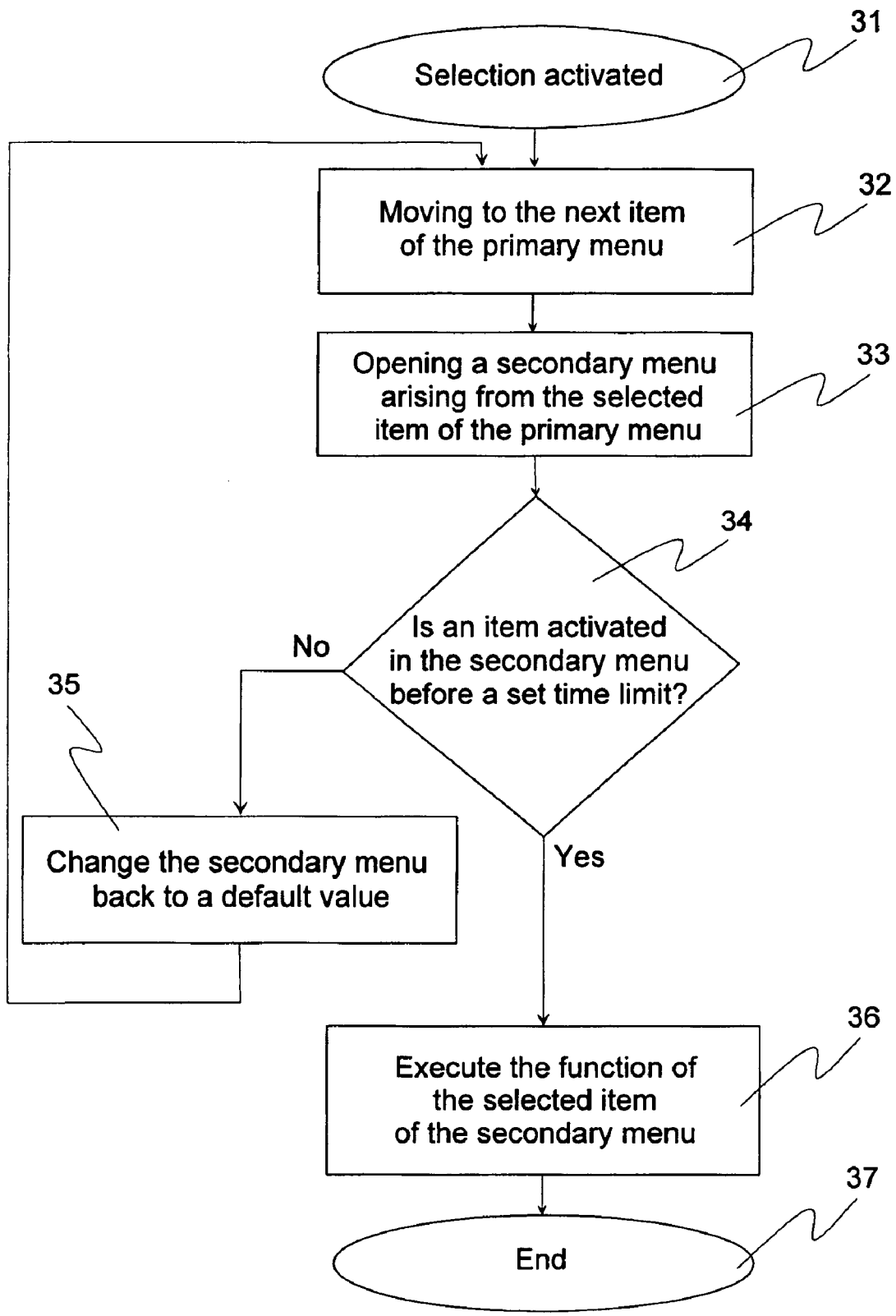
FIG. 3 shows as an exemplary flow chart including main stages of the method according to the invention.

The main steps of the method according to the invention are shown as an exemplary flow chart in FIG. 3. Also the features explained with FIGS. 2a and 2b are used to aid in the description.

The process starts in step 31 where the user activates in a mobile terminal 20 a selection or execution function. This opens up two menus according to the invention, i.e. a primary menu 213 and secondary menu 212a.

The user of the mobile terminal can move inside the primary menu 213 by a browsing key or keys 121. This is depicted as step 32 in the flow chart. When a movement of the cursor 214 takes place from one item of the primary menu 213 to another, due to that a secondary menu 212a opens up on the display 11 of the mobile terminal 20 in step 33. Advantageously the secondary menu 212a according to the invention comprises those alternatives for action, which are most frequently used.

The secondary menu 212a stays on the display for a predetermined duration. After that time in step 34 a comparison is made where it is checked if the user has selected or not an item from the secondary menu 212a. If the answer to the comparison 34 is "Yes", the selected item is executed in step 36. After that the process ends in step 37.

However, if the comparison gives a negative answer "No", i.e. the user has not reacted to the secondary menu 212a, in the step 35 the secondary menu 212a shrinks to a default setting 212b and the process can continue once again from step 32.

Figure 4:
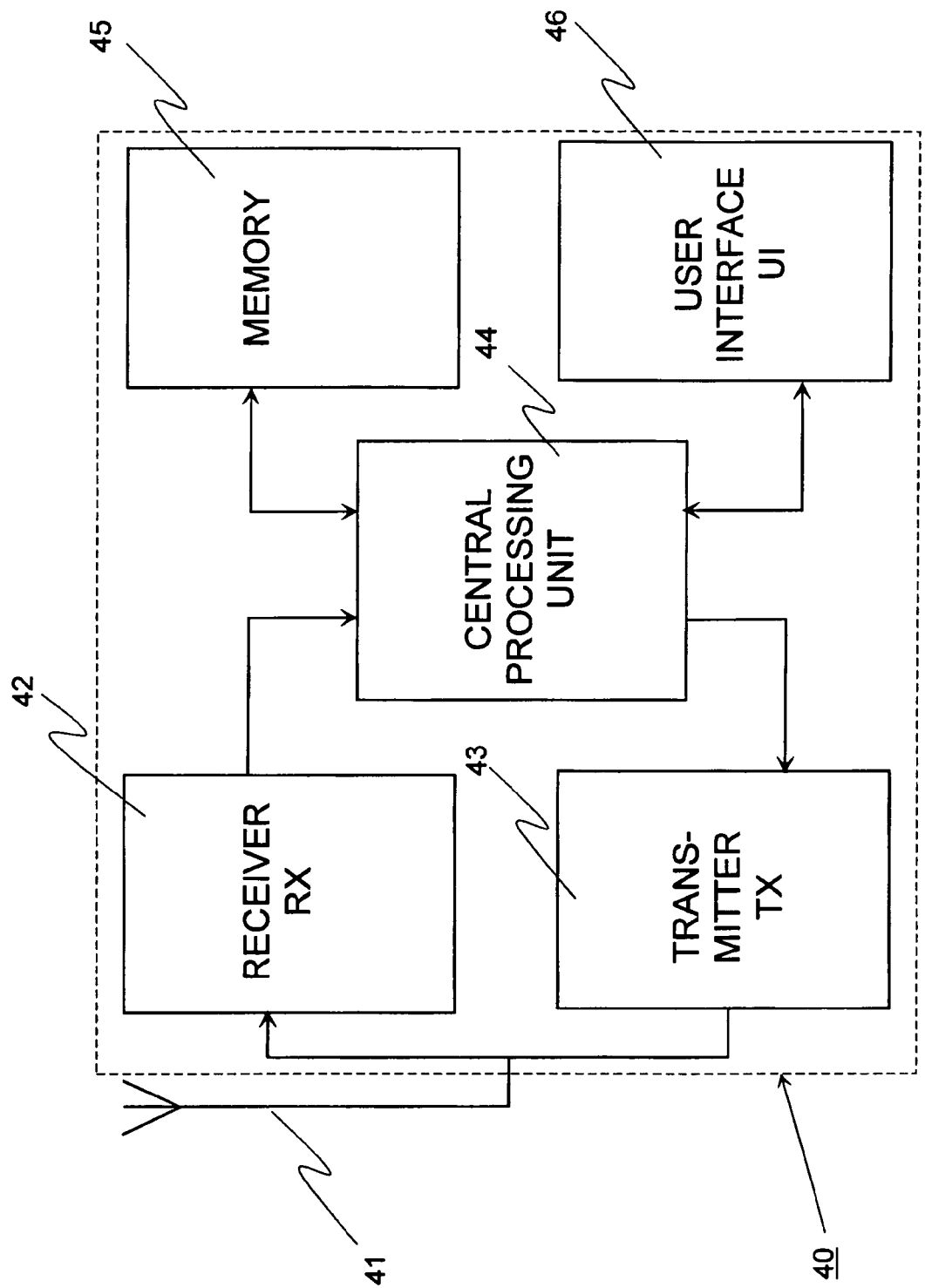
FIG. 4 shows the main parts of the terminal device according to the invention by way of example.

FIG. 4 shows, by way of example, the functional main parts of a terminal device 40 of a cellular network capable of utilizing the selection and execution method according to the invention. The terminal device 40 can be, for example, a prior art GSM, GPRS or UMTS terminal device.

The terminal device 40 uses an antenna 41 in the transmission and reception of signals with the serving cellular network. The receiver means RX of the terminal device 40 are shown by reference 42. The receiver RX comprises prior art means for all messages or signals to be received.

Reference 43 denotes the means of which the transmitter TX of the terminal device 40 is composed. All the signal processing measures required when operating with a cellular network are performed on the signal to be transmitted by the transmitter means 43.

When operating in a prior art cellular network, such as the GSM network, the terminal device 40 also requires a SIM card (not shown in FIG. 4) in order to function.

In the terminal device 40, an essential part with regard to the utilization of the invention is the central processing unit 44 that controls operations of the transmitter and receiver. It controls also the memory 45, in which the software application required in the implementation of the method according to the invention can advantageously be saved.

The terminal device 40 also comprises a user interface 46. It comprises at least a display and keyboard functions as shown in FIGS. 2a and 2b (not shown in FIG. 4). In the method according to the invention the central processing unit 44 controls how the primary and secondary menus are shown on the display of the mobile terminal and how the commands or functions connected the items of these menus are executed. This control function can be called as a menu display controller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method comprising:
   executing a function from a menu on a display of a cellular terminal by:
   opening with one selection on the display both a primary menu including a first cursor and a secondary menu including a second cursor;
   independently moving between items of the primary menu by utilizing said first cursor and moving inside the secondary menu by utilizing the second cursor at the same time;
   changing the secondary menu to show items connected to an item selected by the first cursor in the primary menu;
   executing a function connected to an item selected by the second cursor from the secondary menu, wherein the primary menu and the secondary menu are configured to be displayed as separate entities on opposing sides of a screen, wherein
   showing the opened secondary menu continues a predetermined time; and
   shrinking the secondary menu to a default soft key if no action is fulfilled during said predetermined time.

2. The method according to claim 1 wherein the movement between items of the primary menu is accomplished by utilizing a first browsing key.

3. The method according to claim 1 wherein the movement between items of the secondary menu is accomplished by utilizing a second browsing key.

4. The method according to claim 1 wherein if after said shrinking an activation of the default soft key opens an expanded secondary menu.

5. A computer readable storage medium encoded with software configured to provide a menu display controller of a cellular terminal, the software comprising:
   computer readable code configured to open with one selection on a display of the cellular terminal both a primary menu including a first cursor and a secondary menu including a second cursor;
   computer readable code configured to independently move between items of the primary menu by utilizing said first cursor and move inside the secondary menu by utilizing said second cursor at the same time;
   computer readable code configured to change the secondary menu to show items connected to an item selected by the first cursor in the primary menu;
   computer readable code configured to execute a function connected to an item selected by the second cursor from the secondary menu, wherein the primary menu and the secondary menu are configured to be displayed as separate entities on opposing sides of a screen
   computer readable code configured to show the opened secondary menu a predetermined time; and
   computer readable code configured to shrink the secondary menu to a default soft key of the keyboard of the cellular terminal if no action is fulfilled during said predetermined time.

6. The computer readable storage medium according to claim 5 wherein the movement of the first cursor between items of the primary menu is accomplished by a command given by a first browsing key.

7. The computer readable storage medium according to claim 5 wherein the movement of the second cursor between items of the secondary menu is accomplished by a command given by a second browsing key.

8. The computer readable storage medium according to claim 5 which comprises computer readable code configured to open an expanded secondary menu if an activation of the default soft key has been detected after said shrinking.

9. An apparatus comprising:
   a memory configured to save computer readable code; and
   a central processing unit configured to execute:
   computer readable code configured to open with one selection on a display of the apparatus both a primary menu including a first cursor and a secondary menu including a second cursor;
   computer readable code configured to independently move between items of the primary menu by utilizing said first cursor and move inside the secondary menu by utilizing said second cursor at the same time;
   computer readable code configured to change the secondary menu to show items connected to an item selected by the first cursor in the primary menu;
   computer readable code configured to execute a function connected to an item selected with the second cursor from the secondary menu, wherein the primary menu and the secondary menu are configured to be displayed as separate entities on opposing sides of a screen
   computer readable code configured to show the opened secondary menu a predetermined time; and
   computer readable code configured to shrink the secondary menu to a default soft key if no action is fulfilled during said predetermined time,
   wherein the apparatus is a cellular terminal.

10. The apparatus devise according to claim 9 wherein the movement between items of the primary menu is configured to be accomplished by a first browsing key.

11. The apparatus devise according to claim 9 wherein the movement between items of the secondary menu is configured to be accomplished by a second browsing key.

12. The apparatus according to claim 9 where after said shrinking an activation of the default soft key is configured to open an expanded secondary menu.

13. A computer readable storage medium comprising:
- computer readable code configured to open with one selection on a display of a cellular terminal both a primary menu including a first cursor and a secondary menu including a second cursor;
- computer readable code configured to independently move between items of the primary menu by utilizing said first cursor and move inside the secondary menu by utilizing said second cursor at the same time;
- computer readable code configured to change the secondary menu to show items connected to an item selected by the first cursor in the primary menu;
- computer readable code configured to execute a function connected to an item selected by the second cursor from the secondary menu, wherein the primary menu and the secondary menu are configured to be displayed as separate entities on opposing sides of a screen
- computer readable code configured to show the opened secondary menu for a predetermined time; and
- computer readable code configured to shrink the secondary menu to a default soft key if no action is fulfilled during said predetermined time.

14. The computer readable storage medium according to claim 13 further comprising a computer readable code configured to move between items of the primary menu by a first browsing key.

15. The computer readable storage medium according to claim 13 further comprising a computer readable code configured to move between items of the secondary menu by a second browsing key.

16. The computer readable storage medium according to claim 13 further comprising a computer readable code configured to open an expanded secondary menu if after said shrinking the default soft key is activated.

* * * * *